Sept. 4, 1956  M. P. BAKER  2,761,296
DRIVE SHAFT
Filed Sept. 16, 1954
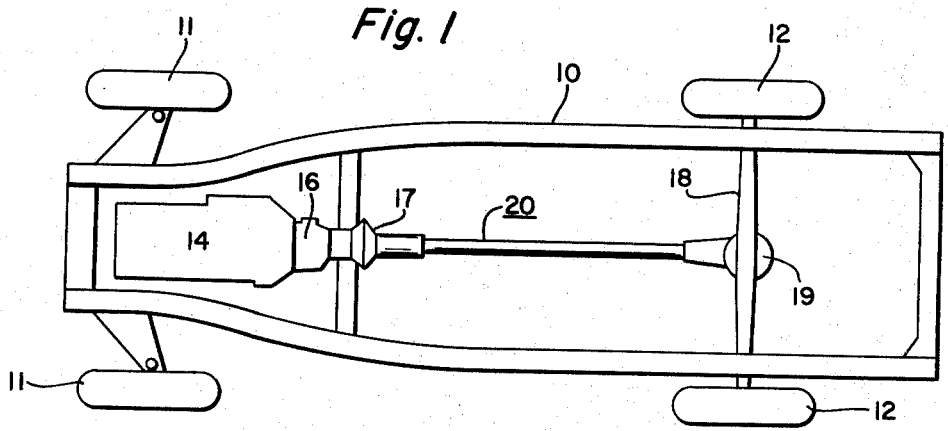
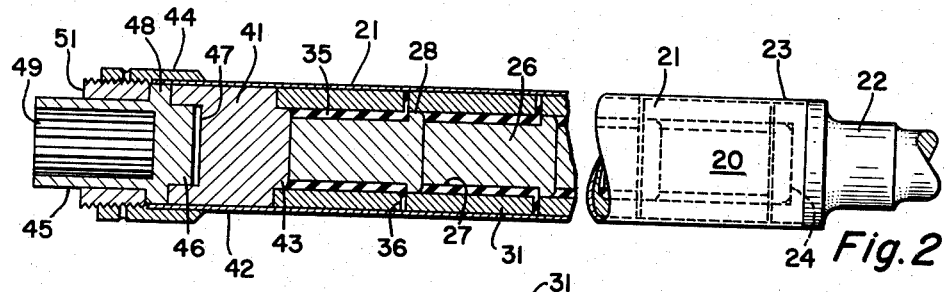
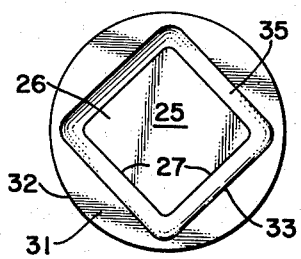
Fig. 4
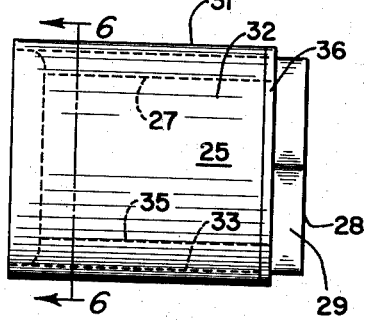
Fig. 3
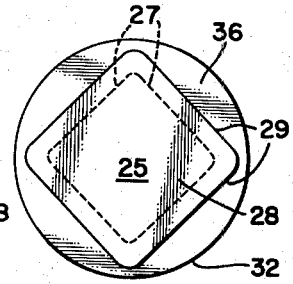
Fig. 5
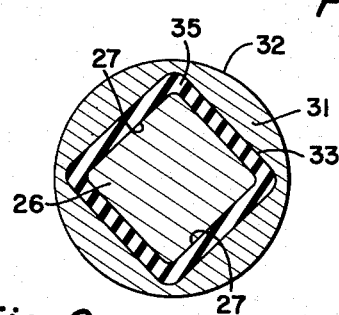
Fig. 6
INVENTOR.
Max P. Baker
His Attorney

United States Patent Office 2,761,296
Patented Sept. 4, 1956

2,761,296

DRIVE SHAFT

Max P. Baker, Dayton, Ohio, assignor to General Motors Corporation, Detroit, Mich., a corporation of Delaware Application September 16, 1954, Serial No. 456,482

6 Claims. (Cl. 64—1)

This invention relates to vehicles and particularly to a drive shaft therefor.

An object of the present invention is to provide an automobile with a shock absorbing drive or propeller shaft.

Another object of the invention is to provide a drive shaft for a motor driven vehicle which will minimize wear and/or breakage of gears and other parts of the vehicle connected with the shaft.

A further object of the invention is to provide a drive shaft between the transmission of an engine or motor means of a vehicle and its differential connection with wheels thereof driven by the engine which will eliminate or reduce to a minimum shocks and jerks imparted to the wheels upon shifting gears within the transmission to start the vehicle in motion and/or to change its speed.

A still further and more specific object of the invention is to provide a drive shaft for an automobile composed of a plurality of series of interlocked together individual shock absorbing units each of which comprises rigid members arranged to have a limited relative rotational movement when torque is applied thereto in which the successive and accumulative limited relative rotational movement of the members of each individual unit is multiplied by the number of units employed in the shaft and utilized to effectively smooth out motion of the automobile for increasing the riding quality thereof.

Further objects and advantages of the present invention will be apparent from the following description, reference being had to the accompanying drawings wherein a preferred form of the invention is clearly shown.

In the drawings:

Figure 1 is a plan view of an automobile chassis provided with a drive shaft connecting an engine transmission mounted on the chassis with the rear wheel differential case;

Figure 2 is a view partly in section and partly in elevation of the drive or propeller shaft of the automobile chassis shown in Figure 1 constructed in accordance with this invention;

Figure 3 is an enlarged side view of one of a series of shock absorbing unit segments employed in the construction of the drive shaft shown in Figures 1 and 2;

Figure 4 is a view of one end of the segment shown in Figure 3;

Figure 5 is a view of the other end of the segment shown in Figure 3; and

Figure 6 is a sectional view taken on the line 6—6 of Figure 3 showing a cushioning body between two relatively rotatable rigid members of the shock absorbing unit segment.

Referring now to the drawings there is shown in Figure 1 thereof a chassis of an automobile comprising a body supporting frame 10 mounted on axles or the like of front and rear wheels 11 and 12 respectively. A motor or engine means 14, preferably of the gasoline burning internal combustion type, is mounted on frame 10 in any suitable manner and the motor or engine includes a conventional transmission gear case 16 and a universal joint case 17. The rear wheels 12 are mounted on axles located within a suitable housing 18 provided centrally thereof with a banjo type differential gear case 19. A shock absorbing propeller or drive shaft, generally represented by the reference character 20, constructed in accordance with this invention, connects a splined pinion shaft of a main driving gear in the differential gear case 19 to a splined shaft of a yoke or the like of a universal joint within the case 17 as is conventional in the art.

The automobile drive or propeller shaft herein disclosed is particularly applicable for horizontal installation wherein the shaft 20 connects a driving means with a means spaced therefrom and disposed in substantially the same horizontal plane therewith although not restricted to such installation. Shaft 20 comprises an elongated cylindrical retainer, retaining sheath or round metal tube 21 (see Figure 2) having a metal connector shaft 22 welded or otherwise suitably and rigidly secured to its rear end 23. Connector 22 is provided, inwardly of the end 23 of tube 21, with a squared aperture 24 therein for a purpose to be hereinafter described. A plurality of series of unitary cylindrical segments, generally indicated by the reference character 25, are disposed in end to end relationship within the elongated retaining sheath or tube 21 and have interlocking portions at opposite ends thereof for engagement with an adjacent segment 25. Each segment 25 includes a rigid inner solid metal member 26 of substantially square cross section and having straight flat outer walls 27 (see Figure 6). Metal member 26 is provided with an enlarged squared head portion 28 having straight flat walls 29 (see Figures 3 and 5) paralleling the walls 27 of the reduced part thereof. Each segment 25 also includes a second or another rigid outer metal member 31 having a cylindrical outer wall surface 32 and a squared aperture or hole 33 therethrough (see Figure 6). It is to be noted that the squared aperture 33 in member 31 is substantially larger than the reduced portion of walls 27 of member 26. It is also to be noted that the members 26 and 31 are of substantially the same length but that the head end 28 on member 26 projects outwardly from the one end of member 31 a considerable distance and the other end of member 26 is disposed inwardly of the other end of member 31. The squared head 28 on member 26 at the one end of each segment element 25 and the squared socket or aperture at the other end of each segment provide the same with interlocking portions. When the segments 25 are placed in end to end relationship into the retainer tube 21 the squared head end 28 of one segment 25 fits into the squared socket portion of aperture and registers with the walls 33 of an adjacent segment of the plurality or series thereof. Thus the series of segments 25 within tube 21 are keyed to one another at their ends.

In accordance with this invention a resilient cushioning body 35 is disposed in the space between the outer walls 27 of member 26 and the inner walls 33 of member 31 of each of the plurality of segments 25. This cushioning body 25 is preferably bonded to each member 26 and 31 of the segments 25 and includes a flared washer-like portion 36 located intermediate the head end 28 of member 26 and the one end of member 31 (see Figures 2, 3 and 5). Cushioning body 35 may be of any suitable flexible material and is preferably formed of an oil or grease resistant elastomer such as butadiene-acrylonitrite copolymer, polychloroprene etc. Methods of moulding and bonding this material to metal or other parts of elements are now conventional and well known to those skilled in the art. The resilient cushioning body 35 permits or is for the purpose of rendering the members 26 and 31 of each segment 25 capable of a limited relative rotational movement with respect to one another when a rotatable force or torque is applied between the members. When this force or torque is applied the corners at the intersection of the flat squared outer walls 27 of member 26 move or rotate a limited distance toward the squared inner walls 33 of member 31 and in so moving the cushioning body 35 is compresesd between the members 26 and 31. The resiliency of body 35 returns member 26 to its normal position with respect to member 31, as shown in the drawings, when the rotatable force or torque is released. Thus the driving member 26 and the driven member 31, or vice versa, are rotatable relative to one another throughout a predetermined or limited degree or arc. This rotational movement of the members 26 and 31 relative to one another in effect serves to form or provide each of the plurality of segments 25 into an individual shock absorbing unit.

The head end 28 of the endmost segment or unit 25 at the one or rear end of shaft 20 registers with and fits into the squared aperture 24 provided in the differential connector shaft 22 to rigidly secure this end segment or unit thereto and to the end 23 of retainer tube 21. A metal connector segment 41 within tube 21, at the other end 42 hereof, has a squared end portion 43 interlocked with the squared aperture of the segment or unit 25 at this end of the shaft. A threaded collar bearing 44 is welded to the end 42 of tube 21. A metal bushing-like element 45, provided with a squared end portion 46 fitting in a squared aperture or socket 47 in connector segment 41, has a shoulder 48 thereon and a splined aperture 49 therein. A metal collar-like screw 51 is screwed into the threads of bearing 44 and abuts against the shoulder 48 on bushing 45 to rotatably lock this bushing and the connector segment 41 in place within tube 21 (see Figure 2). The splined aperture 49 is adapted to receive the end of a splined shaft extending from the universal joint within joint housing 17 of the automobile engine 14.

By interlocking the one end of member 26 of the segments 25, of the plurality of segments or units within tube 21, to the one end of member 31 of an adjacent unit 25 throughout the length of the series thereof the degree of limited relative rotational movement of each shock absorbing unit is combined or multiplied by the number thereof employed in the drive or propeller shaft to increase twisting movement of the shaft from one end to the other end thereof. Torque applied to the splined bushing element 45 first rotates this bushing and connector segment 41 within the retainer tube 21. Rotation of connector segment 41 then transmits this torque to the member 31 of a segment or unit 25 at the end 42 of tube 21. This outer member 31 turns relative to the inner member 26, against the resistance of the flexible body 35, a limited distance or degree before inner member 26 picks up or transmits the torque to the member 31 of the adjacent unit 25. The walls 27 and 33 on the members 26 and 31 respectively move toward one another and compress the resilient cushioning body 35 therebetween. This torque causes the members 26 and 31 to turn or rotate relative to one another and relative to tube 21 throughout the length of the series of units 25 in the tube. The torque is finally transmitted and imparted to the differential drive connector 22 on the end 23 of tube 21 and then shaft connector 22 and tube 21 secured thereto as well as all of the plurality of segments or units 25 rotate in unison. Thus there is provided a somewhat flexible or shock absorbing drive or propeller shaft for a motor vehicle. While the interlocking portions between the plurality of segments or individual shock absorbing units 25 are disclosed as being substantially square joints it is to be understood that these joints can be of any desired shape or form so long as they permit the limited relative rotational movement of the members 26 and 31 of a unit 25 and will transmit torque from one unit or segment to another.

From the foregoing it should be apparent that an improved drive or propeller shaft for an automobile or the like is provided and that this shaft absorbs shocks or jerks tending to be transmitted to the driving wheels of the automobile. By virtue of employing a plurality of like or similar individual shock absorbing units or segments and utilizing movement of each to obtain the full or total desired shock absorbing capacity the manufacturing cost of the improved drive shaft is minimized. The shock absorbing characteristics of the present drive shaft in addition to relieving gears or other elements connected thereto of the impacts or jerks which might damage or break same also smooths out motion of an automobile upon starting same or changing gears for various speeds or pulls to thereby improve the riding quality of the automobile. The shock absorbing drive shaft herein disclosed is designed to replace the conventional drive shaft on present vehicles as well as being for use on newly constructed automobiles.

While the form of embodiment of the invention as herein disclosed constitutes a preferred form, it is to be understood that other forms might be adopted as may come within the scope of the claims which follow.

What is claimed is as follows:

1. A drive shaft connecting a driving means with a means spaced therefrom and disposed in subtsantially the same horizontal plane therewith to be driven thereby comprising in combination, an elongated tube, a series of similar segments arranged in side by side relationship in said tube and having interlocking portions at opposite ends thereof engaging an adjacent segment, each segment including a first member within a second member and an elastomeric body therebetween spacing said members from one another for limited relative rotational movement whereby each segment forms an individual shock absorbing unit, an endmost unit at one end of said plurality of segments being rigidly connected to an end of said tube, and the endmost unit at the other end of said plurality of segments having a rigid connection with said driving means so as to transmit torque applied thereto solely to said tube through the successive and accumulative limited relative rotational movement of said members of the series of units and thence directly to said means to be driven by said driving means.

2. A drive shaft comprising, a plurality of similar segments each having interlocking portions at opposite ends thereof for engagement with an adjacent segment, each segment including an inner member and an outer member having a resilient cushioning body disposed therebetween permitting limited relative rotational movement of one member with respect to the other member thereof, the interlocking portion at one end of each segment being associated with one of its members and the interlocking portion at the other end of each segment being associated with the other of its members whereby each segment forms an individual shock absorbing unit, and means for maintaining said plurality of segments in interlocked relation with one another so that torque applied at one end of the shaft will be transmitted to the other end of said shaft through the successive and accumulative limited rotational movement of said members of the several segments.

3. A drive shaft comprising, a plurality of similar segments each having interlocking portions at opposite ends thereof for engagement with an adjacent segment, each segment including an inner rigid member and an outer rigid member having an elastomeric body disposed therebetween permitting limited relative rotational movement of one rigid member with respect to the other rigid member thereof, the interlocking portion at one end of each segment being provided on its inner rigid member and connected with the outer rigid member of an adjacent segment, the interlocking portion at the other end of each segment being provided on its outer rigid member and connected with the inner rigid member of an adjacent segment, said connections and said elastomeric body cooperating to form each segment into an individual shock absorbing unit, and said connections between said units being such that a torque applied at one end of the shaft is transmitted through the successive and accumulative limited rotational movement of said members of the several segments to the other end of said shaft.

4. A drive shaft connecting a driving means with a driven means spaced therefrom comprising, a series of similar separate segments arranged in end to end relationship with one another, a retainer carrying said segments and maintaining them in said relationship, each of said segments having interlocking portions at opposite ends thereof engaging an adjacent segment, each segment including a first member, a second member and a resilient cushioning body therebetween spacing said members from one another for limited relative rotational movement whereby each segment forms an individual shock absorbing unit, an endmost unit at one end of said series of segments having a connection with one of said means, the endmost unit at the opposite end of said series of segments being connected to the other of said spaced apart means, and torque applied to the first named endmost unit of the series of segments by said one means being transmitted to said other means through the successive and accumulative limited relative rotational movement of said members of the series of units.

5. A drive shaft comprising in combination, an elongated retaining sheath, a plurality of similar segments disposed in side by side relationship within said sheath, each of said similar segments having interlocking portions at opposite ends thereof for engagement with an adjacent segment, each segment including an inner member and an outer member, portions of said members of each segment being drivingly attached together in loose telescoped fitting relation, a resilient cushioning body interposed between said members at the telescoped portions thereof to take up the looseness therebetween while permitting a limited relative rotational movement of one member with respect to the other member against the resiliency of said body, the interlocking portion at one end of each segment being associated with one of its members whereby each segment forms an individual shock absorbing unit, the endmost segment at one end of said plurality of side by side similar segments being connected to said retaining sheath, and the endmost segment at the other end of said plurality of side by side similar segments having a drive connection with a driving means so that torque applied thereto by the driving means will be transmitted to said sheath through the successive and accumulative limited rotational movement of said members of the plurality of segments.

6. A drive shaft comprising in combination, a metal retaining tube, a plurality of similar segments disposed in said tube, each segment having interlocking portions at opposite ends thereof for engagement with an adjacent segment, each segment including an inner metal member and an outer metal member, portions of said metal members of each segment being drivingly attached together in loose telescoped fitting relation, a resilient cushioning body interposed between said metal members at the telescoped portions thereof and bonded thereto to take up the looseness therebetween while permitting a limited relative rotational movement of one member with respect to the other member against the resiliency of said body, the interlocking portion at one end of each segment being provided on its inner member and connected with the outer member of an adjacent segment, the interlocking portion at the other end of each segment being provided on its outer member and connected with the inner member of an adjacent segment, said connections and said body cooperating to form each segment into an individual shock absorbing unit, the endmost segment at one end of said plurality of similar segments being connected to said retaining tube, and the endmost segment at the other end of said plurality of similar segments having a drive connection with a driving means so that torque applied thereto by the driving means is transmitted through the successive and accumulated limited rotational movement of said metal members of the plurality of segments.

References Cited in the file of this patent

UNITED STATES PATENTS

| | | |
|---|---|---|
| 1,897,542 | West | Feb. 14, 1933 |
| 1,979,969 | Geyer | Nov. 6, 1934 |